(12) United States Patent
Tang

(10) Patent No.: US 12,291,062 B1
(45) Date of Patent: May 6, 2025

(54) STEERABLE TOWING HOOK DEVICE

(71) Applicant: Zhejiang Lituo Machinery Co., Ltd., Jinhua (CN)

(72) Inventor: Aiming Tang, Jinhua (CN)

(73) Assignee: Zhejiang Lituo Machinery Co., Ltd., Jinhua (CN)

( * ) Notice: Subject to any disclaimer, the term of this patent is extended or adjusted under 35 U.S.C. 154(b) by 0 days.

(21) Appl. No.: 18/926,680

(22) Filed: Oct. 25, 2024

(30) Foreign Application Priority Data

Oct. 8, 2024 (CN) .......................... 202422422602.8

(51) Int. Cl.
B60D 1/40 (2006.01)

(52) U.S. Cl.
CPC ...................................... B60D 1/40 (2013.01)

(58) Field of Classification Search
CPC .......................................................... B60D 1/40
USPC ...................................................... 280/478.1
See application file for complete search history.

(56) References Cited

U.S. PATENT DOCUMENTS

| 3,904,225 | A | * | 9/1975 | George | B60D 1/40 |
| | | | | | 280/478.1 |
| 3,979,138 | A | * | 9/1976 | George | B60D 1/40 |
| | | | | | 280/491.3 |
| 4,073,508 | A | * | 2/1978 | George | B60D 1/40 |
| | | | | | 280/491.3 |
| 4,116,460 | A | * | 9/1978 | Drower | B60D 1/40 |
| | | | | | 280/491.1 |
| 5,000,473 | A | * | 3/1991 | Johnson | B60D 1/54 |
| | | | | | 280/491.4 |
| 5,277,447 | A | * | 1/1994 | Blaser | B60D 1/40 |
| | | | | | 280/479.2 |
| 5,346,243 | A | * | 9/1994 | Boeck | B60D 1/42 |
| | | | | | 280/491.4 |
| 5,547,210 | A | * | 8/1996 | Dugger | B60D 1/36 |
| | | | | | 280/479.2 |
| 5,580,088 | A | * | 12/1996 | Griffith | B60D 1/40 |
| | | | | | 280/479.2 |
| 7,290,755 | B1 | * | 11/2007 | Thibodeaux | B60D 1/40 |
| | | | | | 254/323 |
| 7,607,678 | B2 | * | 10/2009 | Rebick | B60D 1/44 |
| | | | | | 280/491.3 |

(Continued)

FOREIGN PATENT DOCUMENTS

GB          2196917 A  *  5/1988  ............... B60D 1/40

*Primary Examiner* — Kevin Hurley
(74) *Attorney, Agent, or Firm* — Hemisphere Law, PLLC; Zhigang Ma

(57) ABSTRACT

A steerable towing hook device includes a towing ball body and a towing arm. The towing ball body includes a towing ball and a towing ball mount. The towing arm includes a hitch arm and a fixed arm, and the fixed arm is provided with a square steel configured to connect to a vehicle receiver. The towing ball mount is fixedly connected to an outer back of the hitch arm. The hitch arm is provided with a moving-steering device configured to move and steer the towing ball mount, and the hitch arm is snap-fitted the fixed arm through the device for moving and steering the towing ball mount. A steerable towing hook device with a rational structure and strong practicality enables the towing ball body to move back and forth to steer, adjusts a position of the towing hook flexibly, is convenient to use, and improves work efficiency.

9 Claims, 12 Drawing Sheets

(56) References Cited

U.S. PATENT DOCUMENTS

| | | | |
|---|---|---|---|
| 8,925,955 B2* | 1/2015 | Dekarske | B60D 1/44 |
| | | | 280/491.3 |
| 9,278,592 B2* | 3/2016 | Fincher | B60D 1/54 |
| 2012/0200065 A1* | 8/2012 | Cruz | B60D 1/06 |
| | | | 280/477 |
| 2023/0294468 A1* | 9/2023 | Mah | B60D 1/44 |
| | | | 280/504 |

\* cited by examiner

STEERABLE TOWING HOOK DEVICE

TECHNICAL FIELD

The disclosure relates to the technical field of towed recreational vehicle connection devices, and more particularly to a steerable towing hook device.

BACKGROUND

A towed recreational vehicle (also referred to as travel trailer) does not have an independent drive system and needs to be connected to a towing vehicle through a connection device, and the towing vehicle provides a driving force for travel.

A structure of the connection device directly affects the stability of the connection between the towed recreational vehicle and the towing vehicle. The connection device of the related art typically has a tow hook fixedly disposed on a rear bumper of the towing vehicle, with a load-bearing force of the tow hook concentrated at a single point on the rear bumper of the towing vehicle. This leads to poor stability of the connection device.

In the related art, some towing hook devices include a towing ball body and a towing arm. The towing arm defines a vertical slot, the towing ball body is disposed in the vertical slot, and the towing ball body is connected to two sides of the vertical slot through a pin shaft, which leads to that the towing ball body cannot move back and forth for steering, the position adjustment of the towing hook devices is not flexible enough, the use of the towing hook devices is inconvenient, resulting in prolonged installation and disassembly time and low work efficiency.

SUMMARY

The main purpose of the disclosure is to provide a steerable towing hook device with a rational structure and strong practicality, which allows the towing ball body mount to move back and forth to steer, adjusts a position of the towing hook flexibly, is convenient to use, and improves work efficiency.

In order to achieve the aforementioned purpose, the steerable towing hook device provided by the disclosure includes: a towing ball body, a towing arm, and a moving-steering device; the towing ball body includes: a towing ball, and a towing ball mount; the towing arm includes: a hitch arm, a fixed arm, and a square steel; an outer back of the hitch arm is fixedly connected to the towing ball mount; the square steel is disposed on the fixed arm and configured to connect to a vehicle receiver; the moving-steering device is disposed on the hitch arm and configured to move and steer the towing ball mount, and the hitch arm is snap-fitted to the fixed arm through the moving-steering device.

In an embodiment, the steerable towing hook device further includes: a first connecting rod seat and a second connecting rod seat; the first connecting rod seat is fixedly connected to the hitch arm; the second connecting rod seat is fixedly connected to the square steel; the moving-steering device is disposed between the first connecting rod seat and the second connecting rod seat, and the moving-steering device is a collapsible linkage device.

In an embodiment, the collapsible linkage device includes: a first connecting rod, a second connecting rod, a third connecting rod, and a fourth connecting rod; an end of the first connecting rod and an end of the third connecting rod are respectively fixedly connected to two ends of the first connecting rod seat, the other end of the first connecting rod is provided with a first screw, and the first connecting rod is connected to an end of the second connecting rod through the first screw; the other end of the second connecting rod is connected to an end of the second connecting rod seat; the other end of the third connecting rod is provided with a second screw, the other end of the third connecting rod is connected to an end of the fourth connecting rod through the second screw, and the other end of the fourth connecting rod is connected to the other end of the second connecting rod seat.

In an embodiment, the two ends of the first connecting rod seat are respectively provided with a third screw and a fourth screw, and the end of the first connecting rod and the end of the third connecting rod are respectively fixedly connected to the two ends of the first connecting rod seat through the third screw and the fourth screw.

In an embodiment, the two ends of the second connecting rod seat are respectively provided with a fifth screw and a sixth screw, and the other end of the second connecting rod and the other end of the fourth connecting rod are respectively connected to the two ends of the second connecting rod seat through the fifth screw and the sixth screw.

In an embodiment, the steerable towing hook device further includes: a winch device disposed on the square steel, the winch device includes: a winch rope, and the winch device is connected to the hitch arm through the winch rope.

In an embodiment, the winch device further includes: a winch and a crank; the winch rope is provided on the winch; and the winch device is configured to control a rotation of the winch through the crank.

In an embodiment, the moving-steering device includes a sliding rail device, and the hitch arm is snap-fitted to the fixed arm through the sliding rail device.

In an embodiment, the sliding rail device includes: a first sliding rail, a second sliding rail, and a sliding rail seat disposed on the hitch arm; an end of the first sliding rail and an end of the second sliding rail are respectively connected to the sliding rail seat, and the other end of the first sliding rail and the other end of the second sliding rail are respectively connected to the square steel.

In an embodiment, two ends of the sliding rail seat are respectively provided with a seventh screw and an eighth screw, and two ends of the square steel are respectively provided with a ninth screw and a tenth screw. The end of the first sliding rail and the end of the second sliding rail are respectively connected to the seventh screw and the eighth screw, and the other end of the first sliding rail and the other end of the second sliding rail are respectively connected to the ninth screw and the tenth screw.

The beneficial technical effect of the disclosure is as follows: the disclosure provides the steerable towing hook device, which includes the towing ball body and the towing arm. The towing ball body includes the towing ball and the towing ball mount. The towing arm includes the hitch arm and the fixed arm, and the fixed arm is provided with the square steel configured to the vehicle receiver. The towing ball mount is fixedly connected to the outer back of the hitch arm. The hitch arm is provided with the moving-steering device configured to move and steer the towing ball mount, and the hitch arm is snap-fitted to the fixed arm through the device for moving and steering the towing ball mount.

By the device for moving and steering the towing ball mount disposed between the hitch arm and the fixed arm, a position of the towing ball body is adjusted more flexibly, the towing hook device is used more conveniently, and the installation and disassembly is more time-saving and labor-efficient, thereby increasing work efficiency and reducing labor costs.

The steerable towing hook device provided by the disclosure is highly practical, safe, and reliable, suitable for widespread promotion and use.

BRIEF DESCRIPTION OF DRAWINGS

In order to provide a clearer explanation of the embodiments of the disclosure or the technical solutions in the related art, a brief introduction will be given below to the accompanying drawings required in the description of the embodiments or the related art. It is apparent that the accompanying drawings in the following description are some of the embodiments of the disclosure. For those skilled in the art, other drawings can be obtained based on the structures shown in these drawings without creative labor.

Figure 1:
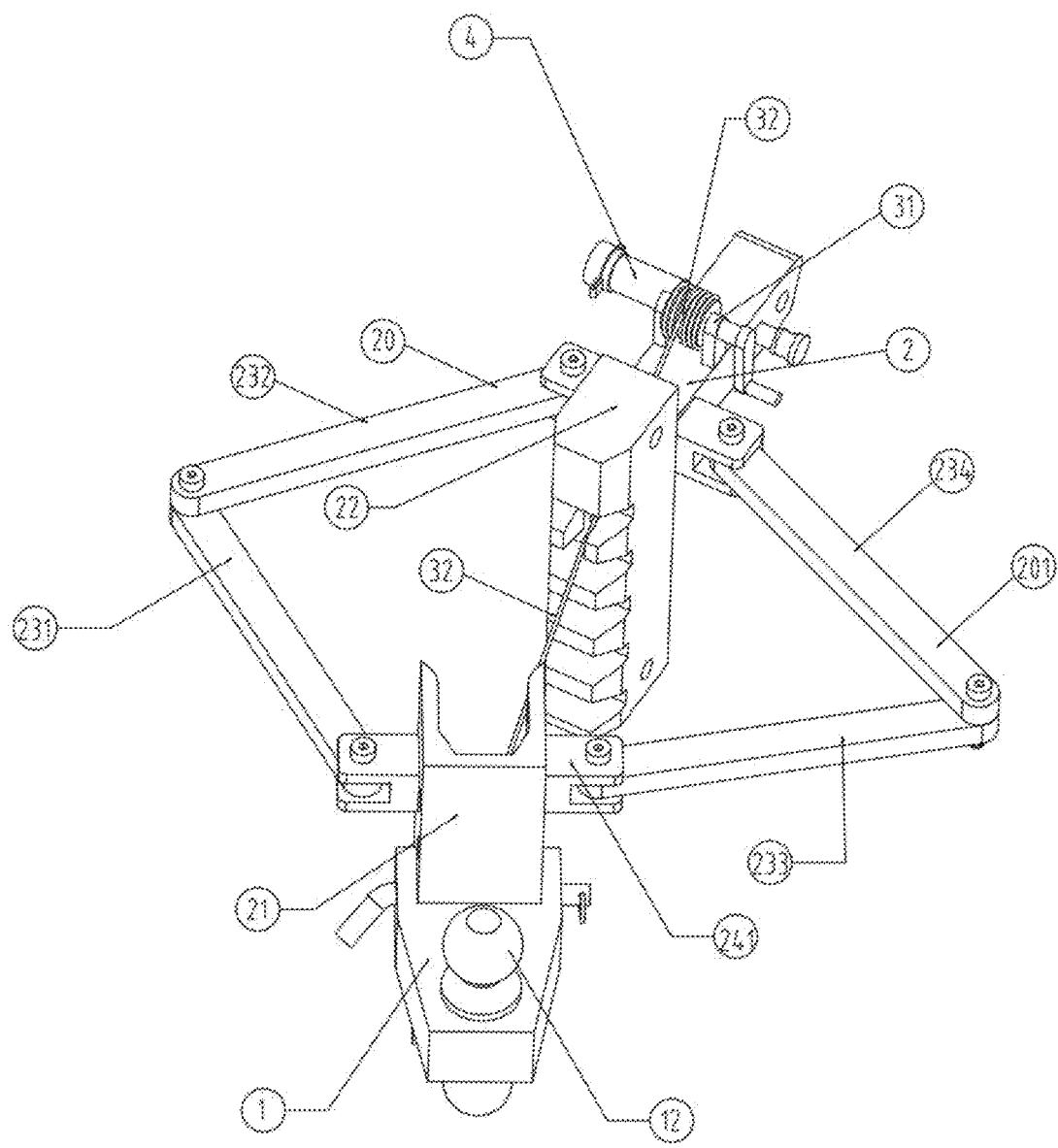
FIG. 1 illustrates a first schematic structural diagram of a steerable towing hook device according to an embodiment 1 of the disclosure.
Figure 2:
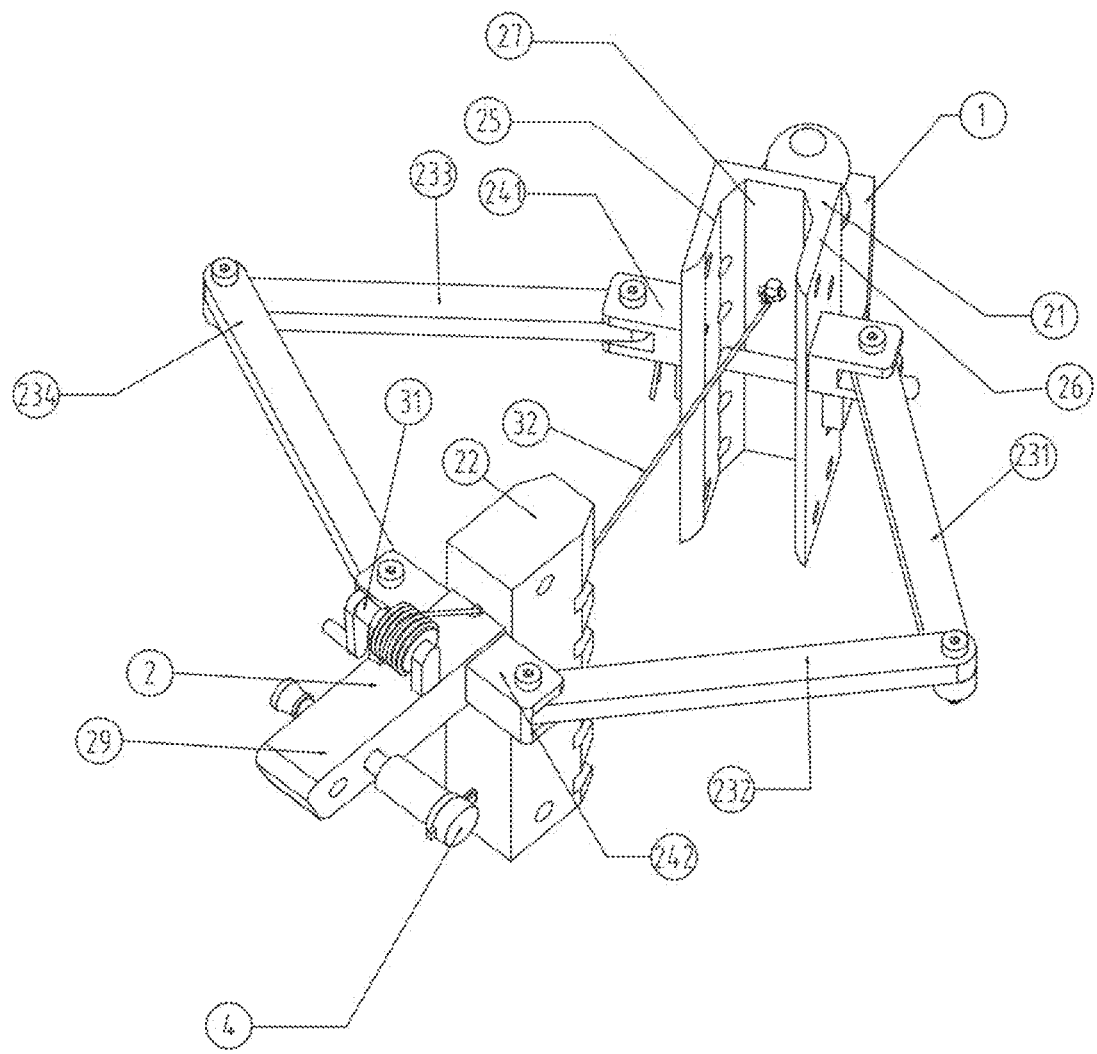
FIG. 2 illustrates a second schematic structural diagram of the steerable towing hook device according to the embodiment 1 of the disclosure.
Figure 3:
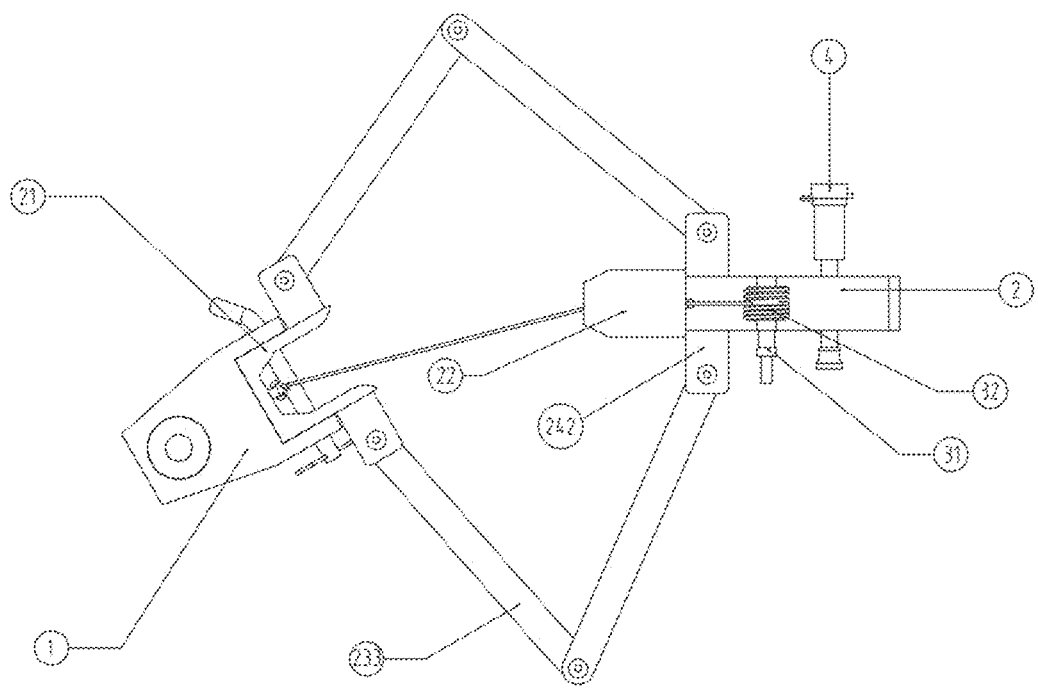
FIG. 3 illustrates a third schematic structural diagram of the steerable towing hook device according to the embodiment 1 of the disclosure.
Figure 4:
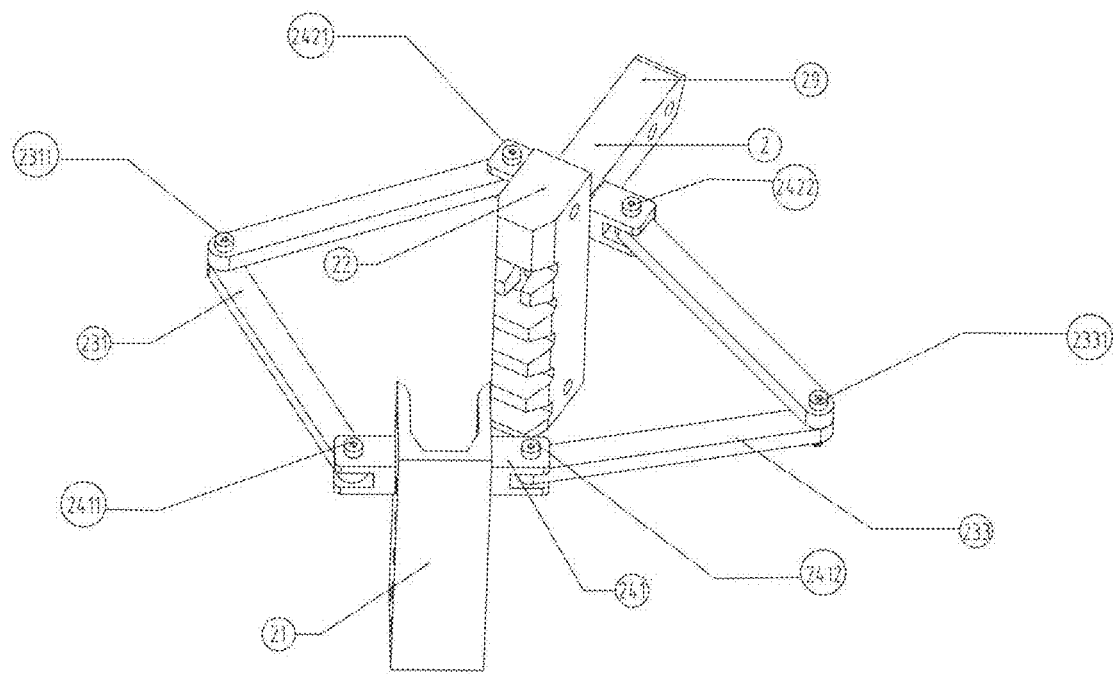
FIG. 4 illustrates a fourth schematic structural diagram of the steerable towing hook device according to the embodiment 1 of the disclosure.

The realization of the purpose, the functional features and the advantages of the disclosure will be further described with reference to the accompanying drawings in conjunction with the embodiments.

DETAILED DESCRIPTION OF EMBODIMENTS

The following will provide a clear and complete description of the technical solution in embodiments of the disclosure, in conjunction with the accompanying drawings. Apparently, the described embodiments are only a part of the embodiments of the disclosure, not all of them. Based on the embodiments in the disclosure, all other embodiments obtained by those skilled in the art without creative labor fall within the scope of protection of the disclosure.

It should be noted that all directional indications (such as up, down, left, right, front, back, etc.) in the embodiments of the disclosure are used solely to explain the relative positions, movements, etc., of the components in a specific attitude (as shown in the accompanying drawings). If that specific attitude changes, the directional indications will correspondingly change as well.

In the disclosure, unless otherwise specifically defined and limited, terms such as "connected" and "fixed" should be broadly understood. For example, "fixed" can mean a rigid connection, a detachable connection, or being formed as one piece; it can be a mechanical connection or an electrical connection; it can be a direct connection or an indirect connection through an intermediary; it can be an internal connection within two components or an interactive relationship between two components, unless specifically limited. For those skilled in the art, the specific meaning of the aforementioned terms in the context of the disclosure can be understood based on the specific circumstances.

Additionally, if the embodiments of the disclosure involve descriptions such as "first", "second", etc., these descriptions of "first", "second", etc., are used solely for descriptive purposes and should not be understood as indicating or implying their relative importance or implicitly specifying the number of the technical features they refer to. Therefore, features specified as "first", "second", etc., can explicitly or implicitly include at least one of such features. Furthermore, the term "and/or" used throughout the text encompasses three concurrent options; for example, "A and/or B" includes options for A only, B only, or both A and B together. Additionally, the technical solutions in different embodiments can be combined with each other, provided that such combinations are achievable by those skilled in the art. When a combination of technical solutions results in contradictions or is unfeasible, such the combination is considered non-existent and is not within the scope of protection claimed by the disclosure.

The disclosure provides a steerable towing hook device.

Embodiment 1

Refer to FIGS. 1-8, in an embodiment of the disclosure, the steerable towing hook device includes a towing ball body 1 and a towing arm 2. The towing ball body 1 includes a towing ball 12 and a towing ball mount 11. The towing arm 2 includes a hitch arm 21 and a fixed arm 22, and a square steel 29 is disposed on the fixed arm 22 and configured to connect to a vehicle receiver. The hitch arm 21 is configured to adjust a ground clearance of the towing ball mount 11. The fixed arm 22 is configured to connect to the vehicle receiver and to engage with the hitch arm 21.

The towing ball mount 11 is fixedly connected to an outer back of the hitch arm 21, and a moving-steering device 20 is disposed on the hitch arm 21 and configured to move and steer the towing ball mount. The hitch arm 21 is snap-fitted to the fixed arm 22 through the moving-steering device 20. The moving-steering device 20 can increase an area of an adjustable position of the towing ball 12 in a horizontal plane, which effectively solves a problem of difficulty in the first step of towing work (connecting the towing ball).

In the embodiment, preferably, the towing ball body 1 includes the towing ball 12. A number of the towing ball 12 is multiple, and multiple towing balls are disposed on the towing ball body 1 according to actual needs. The towing ball 12 is configured to connect to a towing device of a recreational vehicle.

Figure 5:
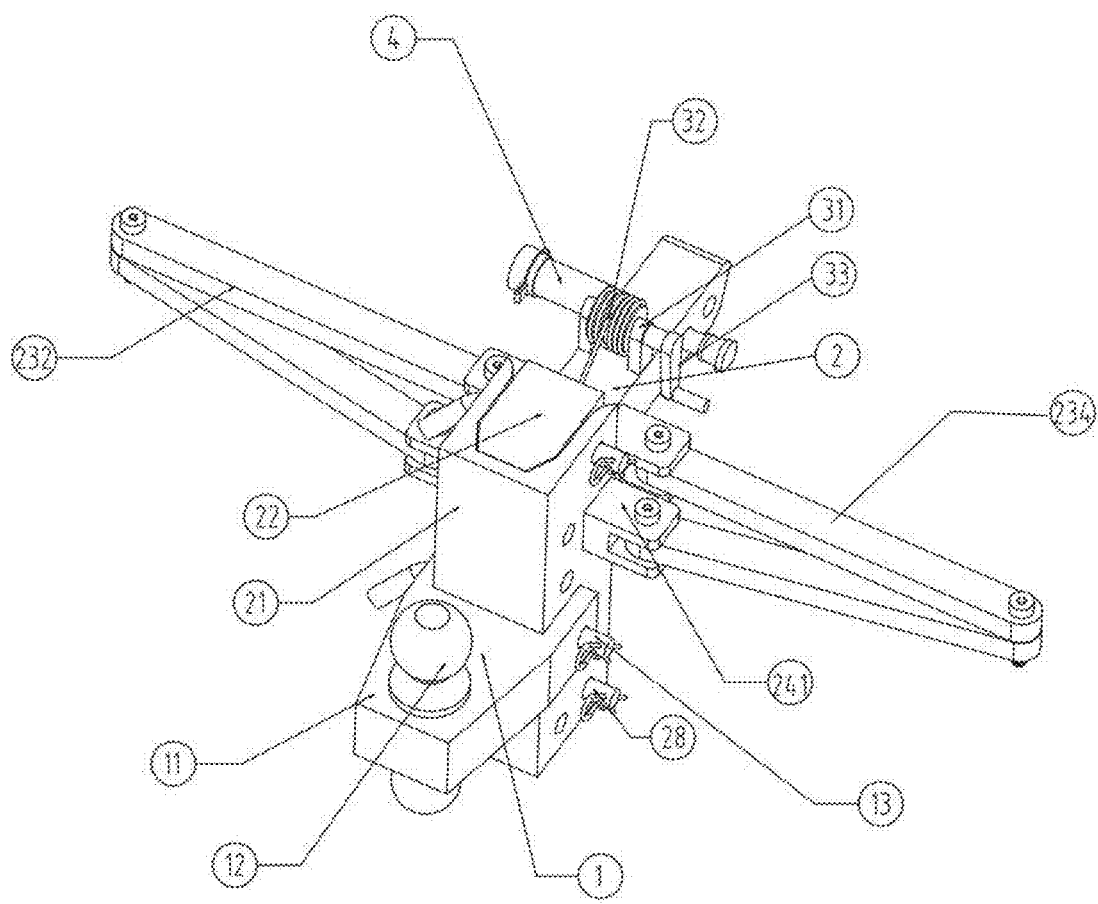
FIG. 5 illustrates a first schematic structural diagram of a closed state of the steerable towing hook device according to the embodiment 1 of the disclosure.
Figure 6:
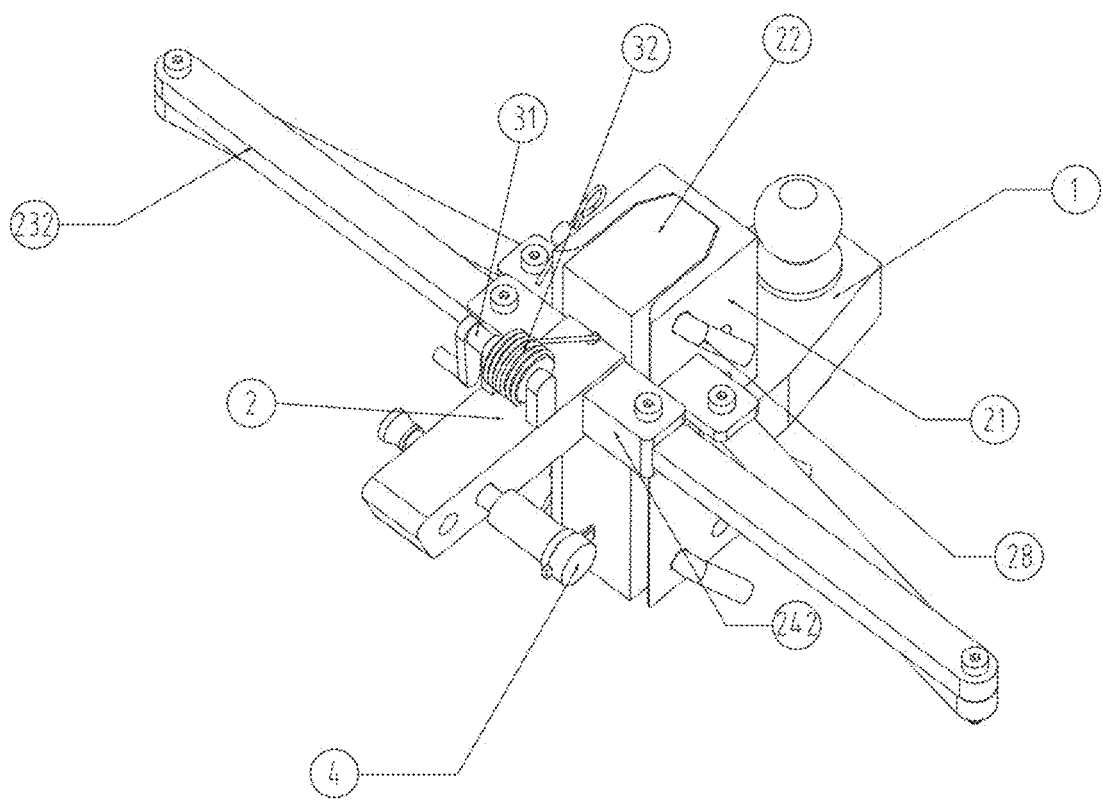
FIG. 6 illustrates a second schematic structural diagram of the closed state of the steerable towing hook device according to the embodiment 1 of the disclosure.
Figure 7:
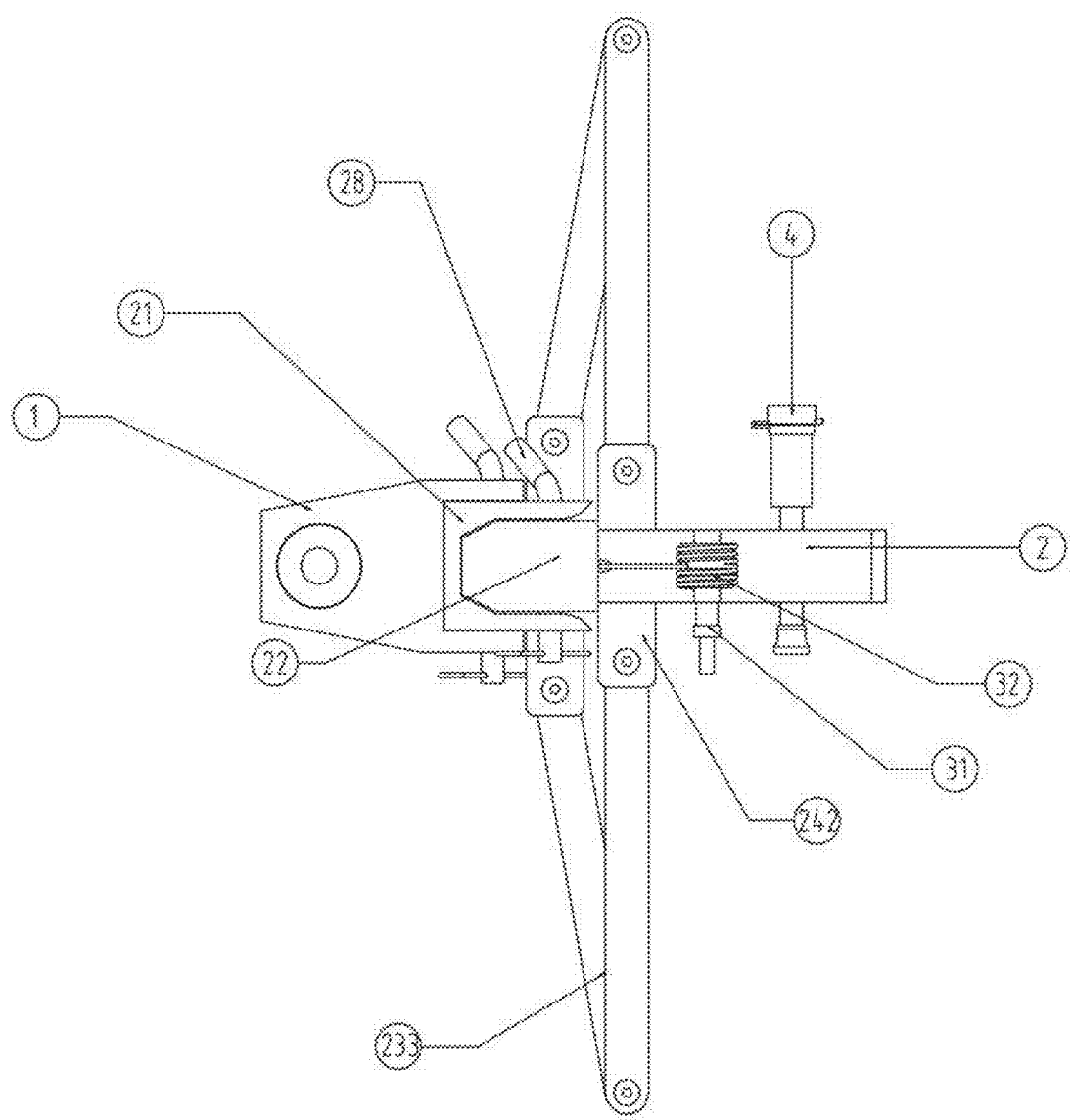
FIG. 7 illustrates a third schematic structural diagram of the closed state of the steerable towing hook device according to the embodiment 1 of the disclosure.
Figure 8:
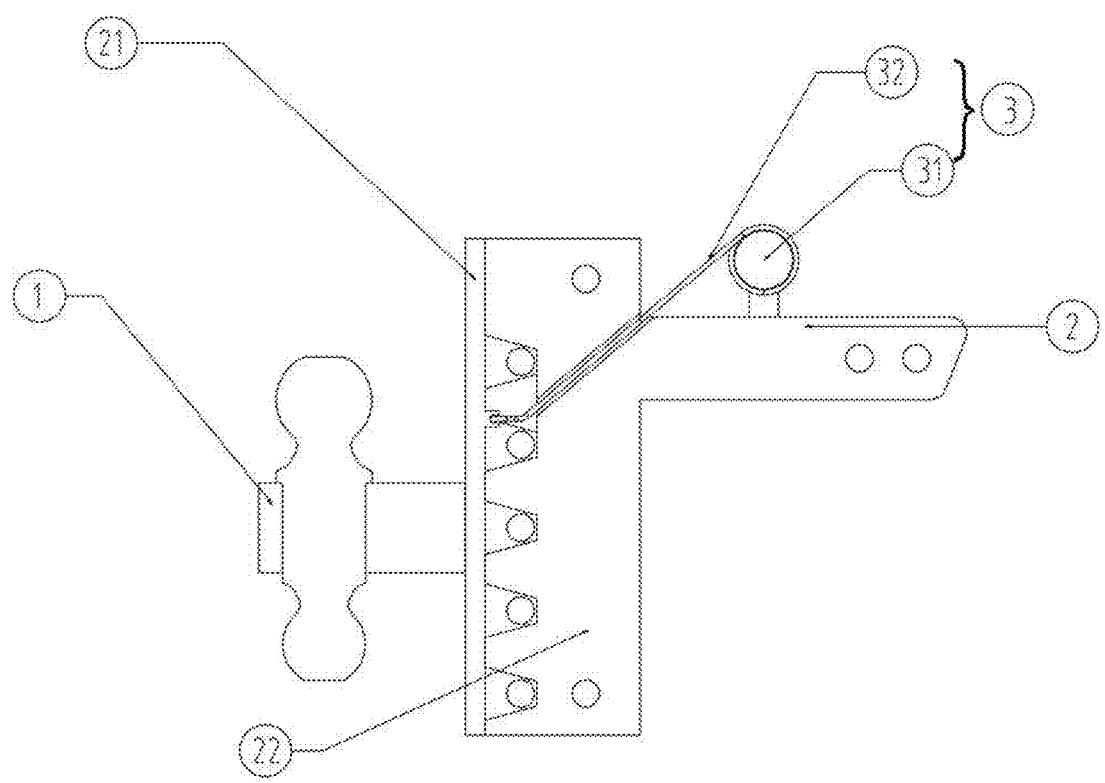
FIG. 8 illustrates a sectional view of the steerable towing hook device according to the embodiment 1 of the disclosure.
Figure 9:
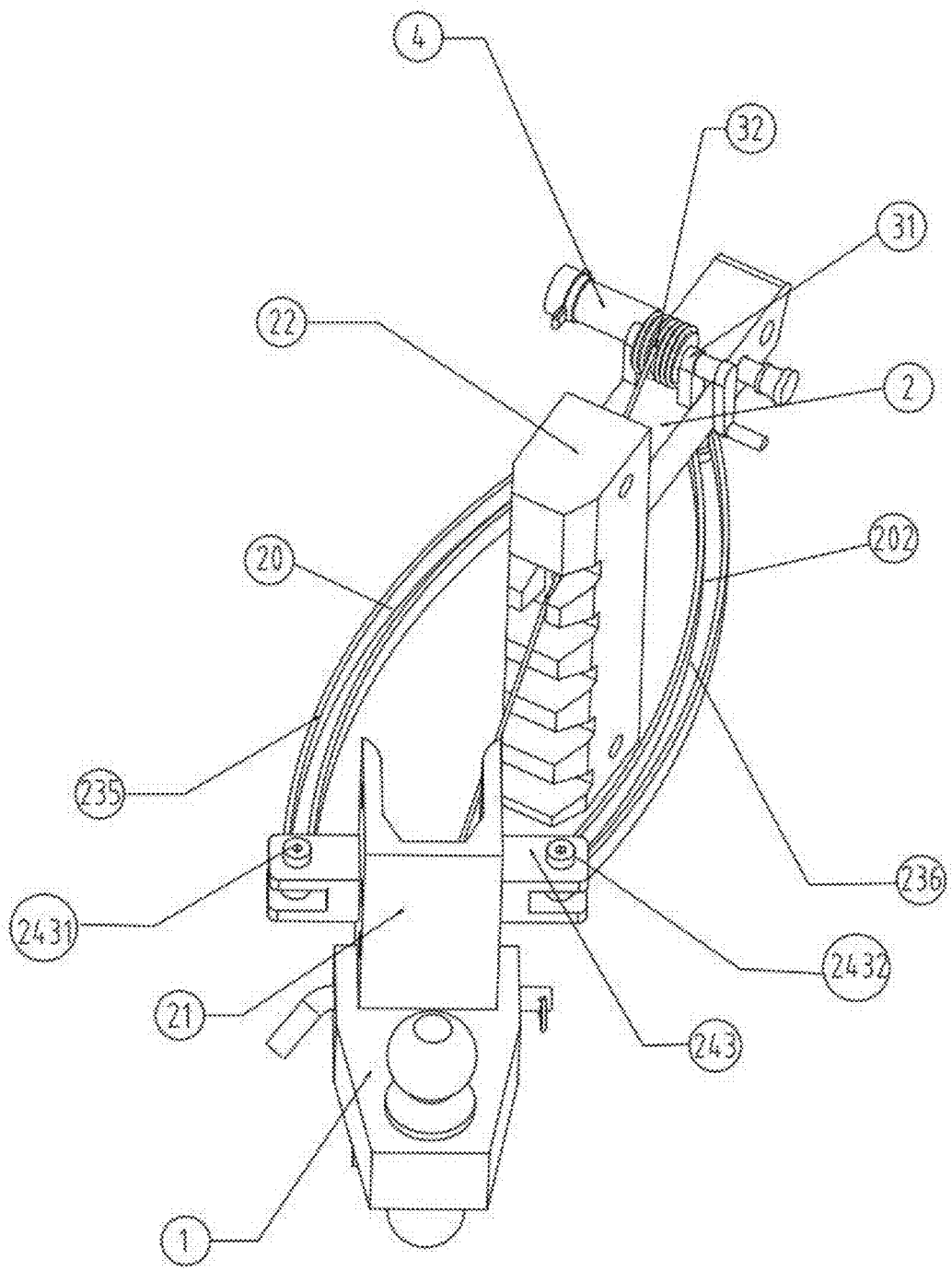
FIG. 9 illustrates a first schematic structural diagram of the steerable towing hook device according to an embodiment 2 of the disclosure.
Figure 10:
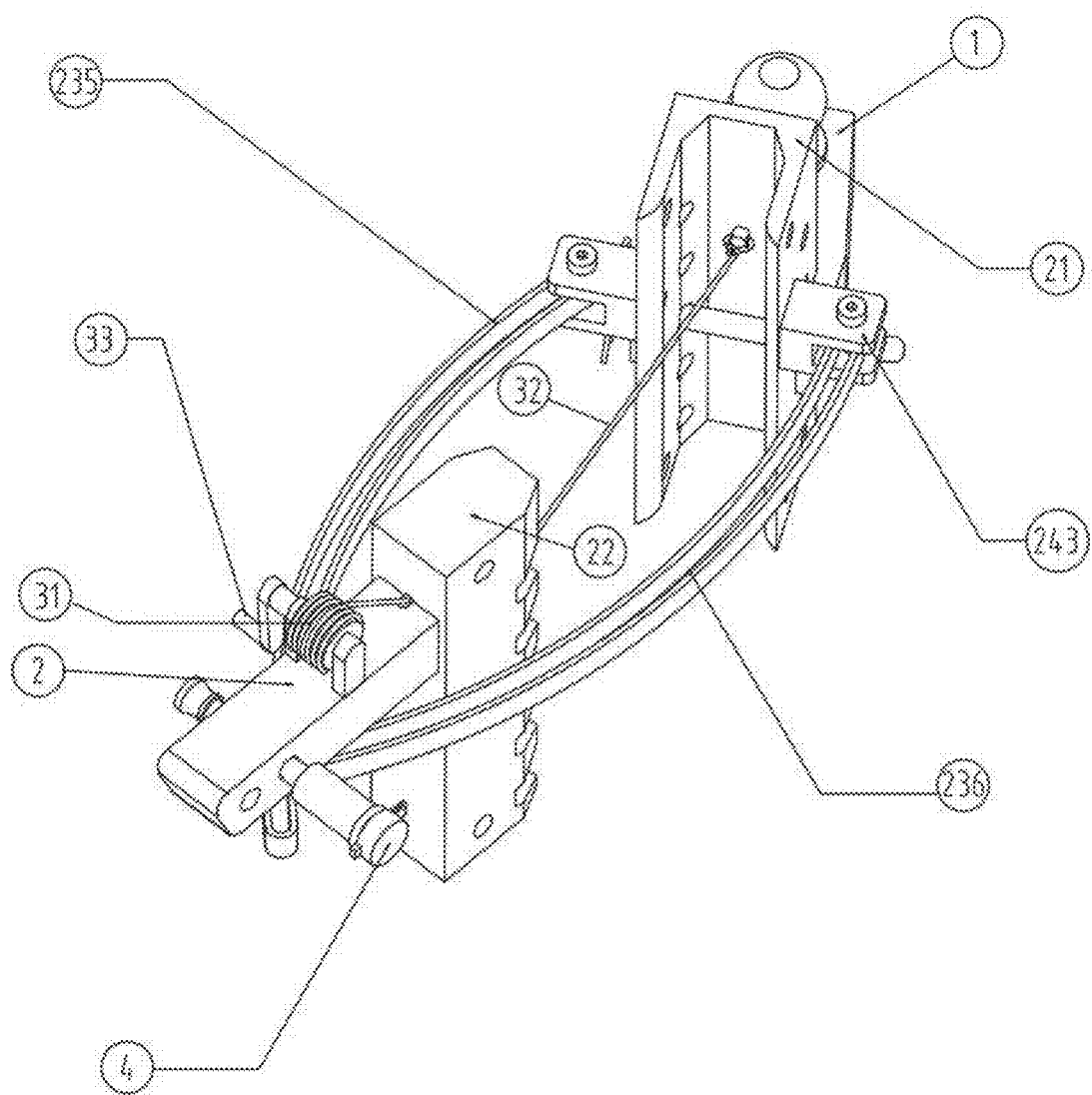
FIG. 10 illustrates a second schematic structural diagram of the steerable towing hook device according to the embodiment 2 of the disclosure.
Figure 11:
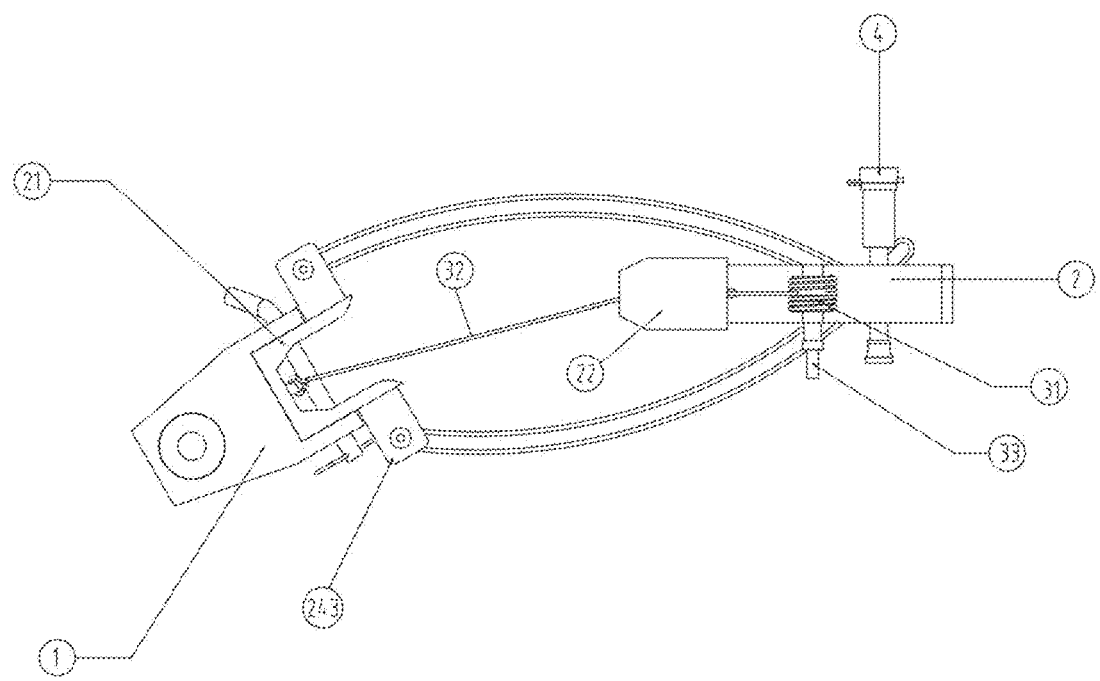
FIG. 11 illustrates a first top view of the steerable towing hook device according to the embodiment 2 of the disclosure.
Figure 12:
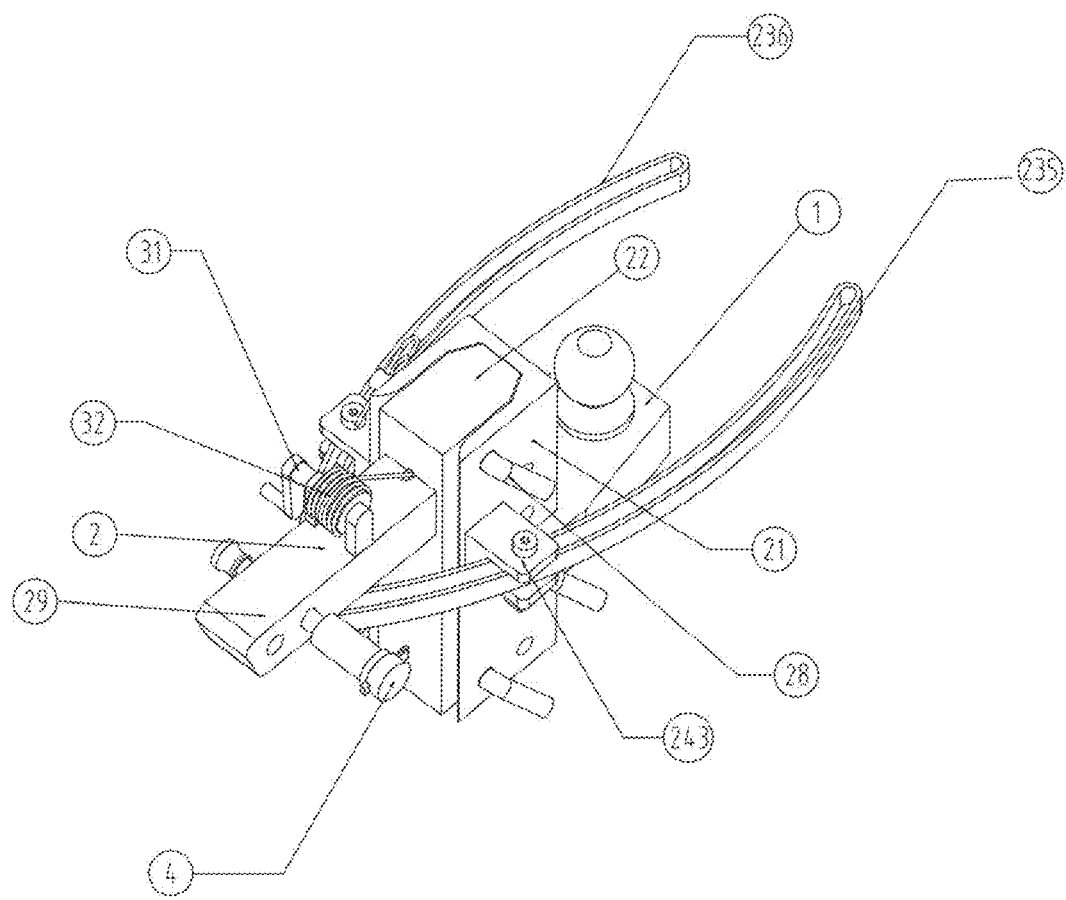
FIG. 12 illustrates a third schematic structural diagram of the steerable towing hook device according to the embodiment 2 of the disclosure.
Figure 13:
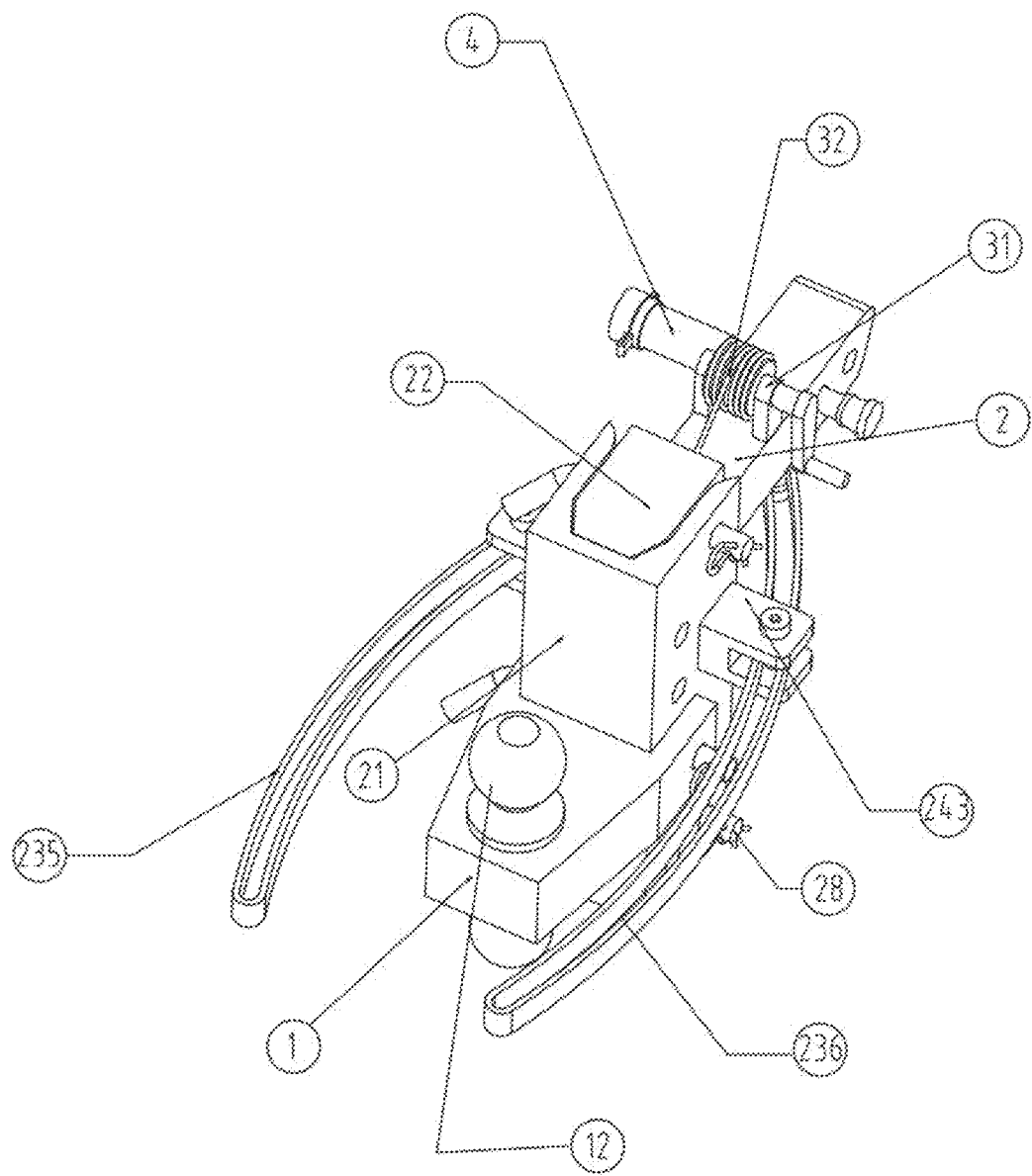
FIG. 13 illustrates a fourth schematic structural diagram of the steerable towing hook device according to the embodiment 2 of the disclosure.
Figure 14:
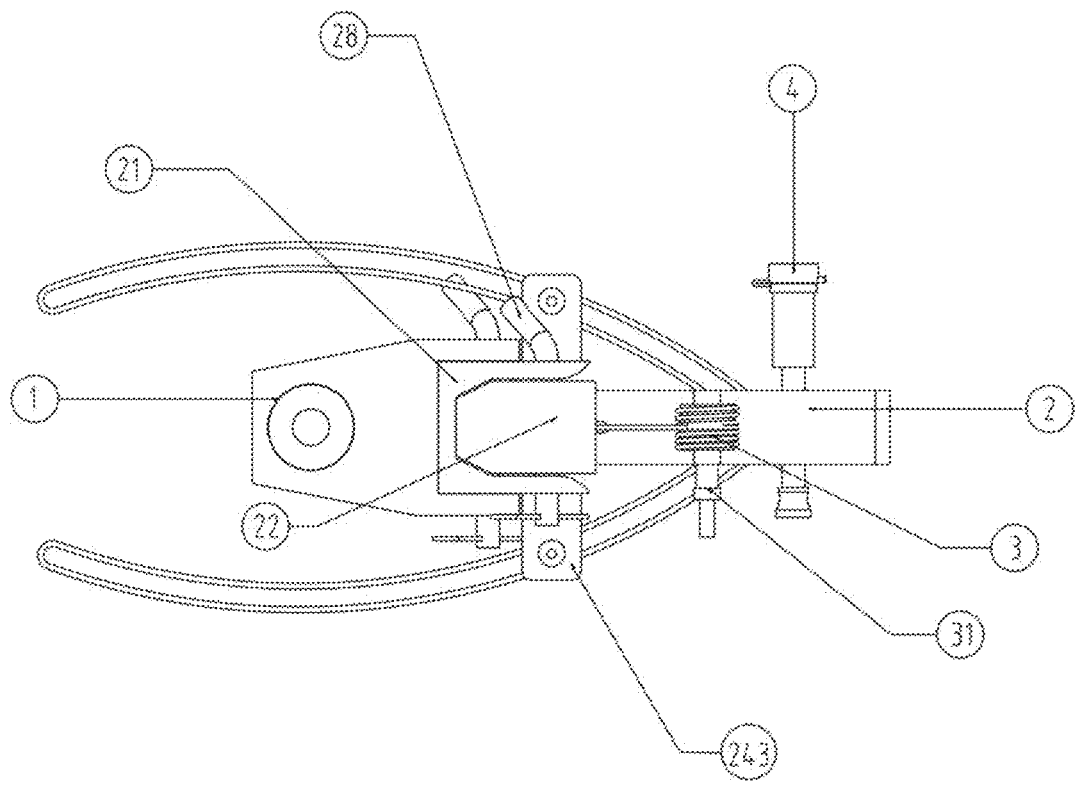
FIG. 14 illustrates a second top view of the steerable towing hook device according to the embodiment 2 of the disclosure.
Figure 15:
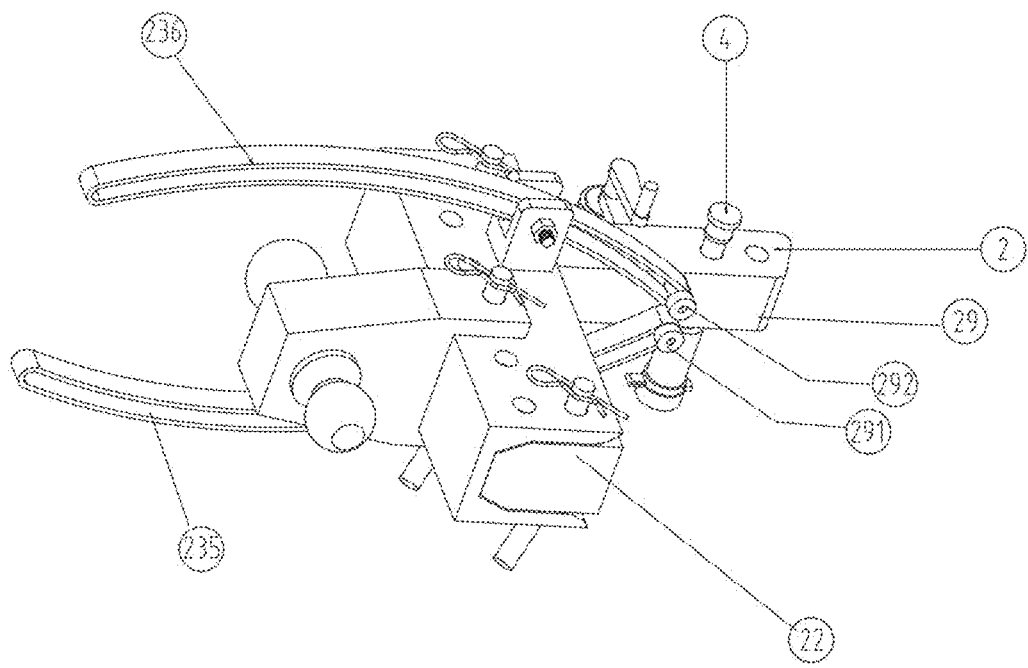
FIG. 15 illustrates a front view of the steerable towing hook device according to the embodiment 2 of the disclosure.

Refer to FIG. 5, in the embodiment, preferably, the towing ball mount 11 is provided with a hitch plug pin 13, and the towing ball mount 11 is fixedly connected to the hitch arm 21 through the hitch plug pin 13. Refer to FIGS. 1-5, in the embodiment, the hitch arm 21 includes a first side edge 25 and a second side edge 26, and an outer side of the first side edge 25 and an outer side of the second side edge 26 include multiple pin holes. The hitch plug pin 13 is connected to the hitch arm 21 through the pin holes, and the towing ball mount 11 is connected to the outer back of the hitch arm 21 through the hitch plug pin 13. Of course, according to actual needs, a number of the hitch plug pin 13 is multiple, and multiple hitch pins 13 is set to connect to the hitch arm 21.

In the embodiment, preferably, a front side of the hitch arm 21 is formed by a vertical groove 27 created by the first side edge 25 and the second side edge 26. The hitch arm 21 is snap-fitted to the fixed arm 22 through the moving-steering device 20. In other words, by manually pushing the moving-steering device 20 to move and steer, the hitch arm 21 moves and steers along with the moving-steering device 20, while the fixed arm 22 remains stationary. When the hitch arm 21 moves and steers to a position opposite the fixed arm 22, the hitch arm 21 is snap-fitted on two sides of the fixed arm 22 through the first side edge 25 and the second side edge 26.

In the embodiment, preferably, the hitch arm 21 is provided with a towing arm plug pin 28, and the hitch arm 21 is connected to the fixed arm 22 through the towing arm plug pin 28. The towing arm plug pin 28 is configured to fix a position of the hitch arm 21 and the fixed arm 22 during vehicle drive.

Refer to FIGS. 1-8, in the embodiment, preferably, the moving-steering device 20 is provided with a first connecting rod seat 241 and a second connecting rod seat 242, the first connecting rod seat 241 is fixedly connected to the hitch arm 21, and the second connecting rod seat 242 is fixedly connected to the square steel 29. The moving-steering device 20 is disposed between the first connecting rod seat 241 and the second connecting rod seat 242, and the moving-steering device 20 is a collapsible linkage device 201.

In the embodiment, the first connecting rod seat 241 is disposed on the hitch arm 21, the second connecting rod seat 242 is disposed on the square steel 29, and the moving-steering device 20 is disposed between the first connecting rod seat 241 and the second connecting rod seat 242. A use of the first connecting rod seat 241 and the second connecting rod seat 242 makes the moving-steering device 20 more stable and reliable.

In the embodiment, preferably, the moving-steering device 20 is the collapsible linkage device 201, which means that the collapsible linkage device 201 can be folded for use or unfolded for use, making it more convenient to use.

In the embodiment, preferably, the collapsible linkage device 201 includes a first connecting rod 231, a second connecting rod 232, a third connecting rod 233 and a fourth connecting rod 234. An end of the first connecting rod 231 and an end of the third connecting rod 233 are respectively fixedly connected to two ends of the first connecting rod seat 241. The other end of the first connecting rod 231 is provided with a first screw 2311, and the first connecting rod 231 is connected to an end of the second connecting rod 232 through the first screw 2311. The other end of the second connecting rod 232 is connected to an end of the second connecting rod seat 242. The other end of the third connecting rod 233 is provided with a second screw 2331, the other end of the third connecting rod 233 is connected to an end of the fourth connecting rod 234 through the second screw 2311, and the other end of the fourth connecting rod 234 is connected to the other end of the second connecting rod seat 242.

In the embodiment, the other end of the first connecting rod 231 is connected to the end of the second connecting rod 232 through the first screw 2311. The other end of the first connecting rod 231 is turned and folded through the first screw 2311, and the end of the second connecting rod 232 is turned and folded through the first screw 2311. Similarly, the other end of the third connecting rod 233 is turned and folded through the second screw 2331, and the end of the fourth connecting rod 234 is turned and folded through the second screw 2331.

In the embodiment, preferably, the two ends of the first connecting rod seat 241 are respectively provided with a third screw 2411 and a fourth screw 2412. The end of the first connecting rod 231 and the end of the third connecting rod 233 are respectively fixedly connected to the two ends of the first connecting rod seat 241 through the third screw 2411 and the fourth screw 2412.

In the embodiment, the end of the first connecting rod 231 is connected to an end of the first connecting rod seat 241 through the third screw 2411, and the end of the first connecting rod 231 is turned and folded through the third screw 2411. The end of the third connecting rod 233 is fixedly connected to the other end of the first connecting rod seat 241 through the fourth screw 2412, and the end of the third connecting rod 233 is turned and folded through the fourth screw 2412.

In the embodiment, preferably, the two ends of the second connecting rod seat 242 are respectively provided with a fifth screw 2421 and a sixth screw 2422, and the other end of the second connecting rod 232 and the other end of the fourth connecting rod 234 are respectively connected to the two ends of the second connecting rod seat 242 through the fifth screw 2421 and the sixth screw 2422.

In the embodiment, the other end of the second connecting rod 232 is connected to the end of the second connecting rod seat 242 through the fifth screw 2421, and the other end of the second connecting rod 232 is turned and folded through the fifth screw 2421. The other end of the fourth connecting rod 234 is fixedly connected to the other end of the second connecting rod seat 242 through the sixth screw 2422, and the other end of the fourth connecting rod 234 is turned and folded through the sixth screw 2422.

Refer to FIGS. 1-8, in the embodiment, preferably, in order to facilitate the movement and steering of the collapsible linkage device 201, a winch device 3 is disposed on the square steel 29, the winch device 3 includes a winch rope 32, and the winch device 3 is connected to the hitch arm 21 through the winch rope 32.

In the embodiment, the fixed arm 22 defines holes, an end of the winch rope 32 is wound around the winch device 3, and the other end of the winch rope 32 is connected to vertical groove 27 of the hitch arm 21. Preferably, the vertical groove 27 is equipped with a hook, and the other end of the winch rope 32 is fixedly connected to the hook. When the winch device 3 controls the winch rope 32 to extend and retract, the hitch arm 21 extends and retracts through the collapsible linkage device 201. When the hitch arm 21 is steered to the position opposite the fixed arm 22 by the collapsible linkage device 201, the hitch arm 21 is snap-fitted onto the fixed arm 22.

In the embodiment, preferably, in order to save time and effort and increase efficiency, the winch device 3 further includes a winch 31 and a crank 33, and the winch rope 32 is provided on the winch 31, and the winch device 3 controls a rotation of the winch 31 through the crank 33.

In the embodiment, the crank 33 controls the rotation of the winch 31, and the winch rope 32 pulls the hitch arm 21 to move forward and backward as the winch 31 rotates. The hitch arm 21 moves and steers to snap-fit onto the fixed arm 22 through the collapsible linkage device 201.

Embodiment 2

Refer to FIGS. 9-15, in the embodiment, preferably, the moving-steering device 20 includes a sliding rail device 202, and the hitch arm 21 is snap-fitted to the fixed arm 22 through the sliding rail device 202.

In the embodiment, the hitch arm 21 moves and steers the towing ball body 1 along with the sliding rail device 202. When the hitch arm 21 is steered to the position opposite the fixed arm 22, the hitch arm 21 is snap-fitted onto the fixed arm 22.

The towing ball body 1 moves and steers along with the sliding rail device 202, allowing for more flexible position adjustment and easier use.

In the embodiment, preferably, the sliding rail device 202 includes a first sliding rail 235 and a second sliding rail 236, and a sliding rail seat 243 is disposed on the hitch arm 21. An end of the first sliding rail 235 and an end of the second sliding rail 236 are respectively connected to the sliding rail seat 243, and the other end of the first sliding rail 235 and the other end of the second sliding rail 236 are respectively connected to the square steel 29.

In the embodiment, the first sliding rail 235 and the second sliding rail 236 are closed at two ends. One of the two ends of the first sliding rail 235 and one of the two ends of the second sliding rail 236 are respectively provided on two ends of the sliding rail seat 243, and the other end of the first sliding rail 235 and the other end of the second sliding rail 236 are respectively provided on two ends of the square steel 29. The hitch arm 21 moves and steers the towing ball body 1 along with the first sliding rail 235 and the second sliding rail 236. When the hitch arm 21 is steered to the position opposite the fixed arm 22, the hitch arm 21 is snap-fitted onto the fixed arm 22.

In the embodiment, preferably, the two ends of the sliding rail seat 243 are respectively provided with a seventh screw 2431 and an eighth screw 2432, and the two ends of the square steel are respectively provided with a ninth screw 291 and a tenth screw 292. The end of the first sliding rail 235 and the end of the second sliding rail 236 are respectively connected to the seventh screw 2431 and the eighth screw 2432, and the other end of the first sliding rail 235 and the other end of the second sliding rail 236 are respectively connected to the ninth screw 291 and the tenth screw 292.

In the embodiment, the hitch arm 21 respectively slides on the first sliding rail 235 and the second sliding rail 236 through the seventh screw 2431 and the eighth screw 2432. When the hitch arm 21 slides and steers to the position opposite the fixed arm 22, the hitch arm 21 is snap-fitted onto the fixed arm 22.

Refer to FIGS. 9-15, in the embodiment, preferably, in order to facilitate the sliding and steering of the sliding rail device 202, the winch device 3 is disposed on the square steel 29, the winch device 3 includes the winch rope 32, and the winch device 3 is connected to the hitch arm 21 through the winch rope 32.

In the embodiment, the fixed arm 22 defines holes, the end of the winch rope 32 is wound around the winch device 3, and the other end of the winch rope 32 is connected to the vertical groove 27 of the hitch arm 21. Preferably, the vertical groove 27 is equipped with the hook, and the other end of the winch rope 32 is fixedly connected to the hook. When the winch device 3 controls the winch rope 32 to extend and retract, the hitch arm 21 extends and retracts through the sliding rail device 202. When the hitch arm 21 is steered to the position opposite the fixed arm 22 by the sliding rail device 202, the hitch arm 21 is snap-fitted onto the fixed arm 22.

In the embodiment, preferably, in order to save time and effort and increase efficiency, the winch device 3 further includes the winch 31 and the crank 33, the winch rope 32 is provided on the winch 31, and the winch device 3 controls the rotation of the winch 31 through the crank 33.

In the embodiment, the crank 33 controls the rotation of the winch 31, and the winch rope 32 pulls the hitch arm 21 to move forward and backward as the winch 31 rotates. The hitch arm 21 steers and moves to snap-fit onto the fixed arm 22 through the sliding rail device 202.

In the embodiment, preferably, a side wall of the square steel 29 is equipped with a receiver plug pin lock 4 for connecting to a recreational vehicle receiver (i.e., the vehicle receiver).

The square steel 29 is connected to the recreational vehicle receiver through the receiver plug pin lock 4. The receiver plug pin lock 4 defines an anti-theft function.

The steerable towing hook device provided by the disclosure has a rational structure and strong practicality. It allows for more flexible movement and steering, and more convenient installation and disassembly, greatly improving work efficiency and reducing labor costs.

The above descriptions are merely the optional embodiments of the disclosure and do not limit the scope of the patent of the disclosure. Any equivalent structural modifications made under the inventive concept of the disclosure, utilizing the content of the specification and drawings, or direct/indirect applications in other related technical fields are all included in the scope of patent protection of the present invention.

What is claimed is:

1. A steerable towing hook device comprising:
   a towing ball body, wherein the towing ball body comprises:
     a towing ball; and
     a towing ball mount;
   a towing arm, wherein the towing arm comprises:
     a hitch arm, wherein an outer back of the hitch arm is fixedly connected to the towing ball mount;
     a fixed arm; and
     a square steel, disposed on the fixed arm and configured to connect to a vehicle receiver; and
   a moving-steering device, disposed on the hitch arm and configured to move and steer the towing ball mount, wherein the hitch arm is snap-fitted to the fixed arm through the moving-steering device;
   wherein the steerable towing hook device further comprises:

a first connecting rod seat, wherein the first connecting rod seat is fixedly connected to the hitch arm; and a second connecting rod seat, wherein the second connecting rod seat is fixedly connected to the square steel; and wherein the moving-steering device is disposed between the first connecting rod seat and the second connecting rod seat, and the moving-steering device is a collapsible linkage device.

2. The steerable towing hook device as claimed in claim 1, wherein the collapsible linkage device comprises:

a first connecting rod;

a second connecting rod;

a third connecting rod; and a fourth connecting rod;

wherein an end of the first connecting rod and an end of the third connecting rod are respectively fixedly connected to two ends of the first connecting rod seat, the other end of the first connecting rod is provided with a first screw, the first connecting rod is connected to an end of the second connecting rod through the first screw, the other end of the second connecting rod is connected to an end of the second connecting rod seat, the other end of the third connecting rod is provided with a second screw, the other end of the third connecting rod is connected to an end of the fourth connecting rod through the second screw, and the other end of the fourth connecting rod is connected to the other end of the second connecting rod seat.

3. The steerable towing hook device as claimed in claim 2, wherein the two ends of the first connecting rod seat are respectively provided with a third screw and a fourth screw, and the end of the first connecting rod and the end of the third connecting rod are respectively fixedly connected to the two ends of the first connecting rod seat through the third screw and the fourth screw.

4. The steerable towing hook device as claimed in claim 3, wherein the two ends of the second connecting rod seat are respectively provided with a fifth screw and a sixth screw, and the other end of the second connecting rod and the other end of the fourth connecting rod are respectively connected to the two ends of the second connecting rod seat through the fifth screw and the sixth screw.

5. The steerable towing hook device as claimed in claim 4, wherein the steerable towing hook device further comprises:

a winch device is disposed on the square steel, wherein the winch device comprises:

a winch rope, wherein the winch device is connected to the hitch arm through the winch rope.

6. The steerable towing hook device as claimed in claim 5, wherein the winch device further comprises:

a winch, wherein the winch rope is provided on the winch; and a crank, wherein the winch device is configured to control a rotation of the winch through the crank.

7. The steerable towing hook device as claimed in claim 1, wherein the moving-steering device comprises a sliding rail device, and the hitch arm is snap-fitted to the fixed arm through the sliding rail device.

8. The steerable towing hook device as claimed in claim 7, wherein the sliding rail device comprises:

a first sliding rail;

a second sliding rail; and a sliding rail seat, disposed on the hitch arm;

wherein an end of the first sliding rail and an end of the second sliding rail are respectively connected to the sliding rail seat, and the other end of the first sliding rail and the other end of the second sliding rail are respectively connected to the square steel.

9. The steerable towing hook device as claimed in claim 8, wherein two ends of the sliding rail seat are respectively provided with a first screw and a second screw, two ends of the square steel are respectively provided with a third screw and a fourth screw, the end of the first sliding rail and the end of the second sliding rail are respectively connected to the first screw and the second screw, and the other end of the first sliding rail and the other end of the second sliding rail are respectively connected to the third screw and the fourth screw.

\* \* \* \* \*